(12) United States Patent
Coleman et al.

(10) Patent No.: US 10,630,378 B2
(45) Date of Patent: Apr. 21, 2020

(54) BANDWIDTH OPTIMIZING RANGE ADJUSTMENTS AMONG SATELLITES

(71) Applicant: Vector Launch Inc., Tucson, AZ (US)

(72) Inventors: Shaun Coleman, San Jose, CA (US); John Metzger, Campbell, CA (US); Darren D. Garber, Rancho Palos Verdes, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/892,854

(22) Filed: Feb. 9, 2018

(65) Prior Publication Data

US 2019/0253134 A1 Aug. 15, 2019

(51) Int. Cl.
*H04B 7/185* (2006.01)
*H04W 72/08* (2009.01)

(52) U.S. Cl.
CPC ..... *H04B 7/18519* (2013.01); *H04B 7/18513* (2013.01); *H04B 7/18521* (2013.01); *H04B 7/18597* (2013.01); *H04W 72/085* (2013.01)

(58) Field of Classification Search
CPC ............ H04B 7/18513; H04B 7/18519; H04B 7/18521; H04B 7/18597; H04W 72/085
See application file for complete search history.

(56) References Cited

U.S. PATENT DOCUMENTS

| | | |
|---|---|---|
| 4,375,697 A | 3/1983 | Visher |
| 4,912,656 A | 3/1990 | Cain et al. |
| 5,410,728 A | 4/1995 | Bertiger et al. |
| 5,414,432 A | 5/1995 | Penny, Jr. et al. |
| 5,467,345 A | 11/1995 | Cutler, Jr. et al. |
| 5,471,641 A | 11/1995 | Dosiere et al. |
| 5,483,664 A | 1/1996 | Moritz et al. |
| 5,561,838 A | 10/1996 | Chandos et al. |
| 5,666,648 A | 9/1997 | Stuart |
| 5,678,175 A | 10/1997 | Stuart et al. |
| 5,722,042 A | 2/1998 | Kimura et al. |
| 5,724,345 A | 3/1998 | Guarneri et al. |
| 5,867,765 A | 2/1999 | Nilsson |
| 5,886,991 A | 3/1999 | Guarneri et al. |

(Continued)

FOREIGN PATENT DOCUMENTS

| | | |
|---|---|---|
| CN | 101459946 A | 6/2009 |
| CN | 104902515 A | 9/2015 |

(Continued)

OTHER PUBLICATIONS

International Application No. PCT/US2018/019492, International Search Report & Written Opinion, 9 pages, dated Oct. 19, 2018.

(Continued)

*Primary Examiner* — Dominic E Rego (57) ABSTRACT

Various enhanced operations and orbital techniques for satellite devices are discussed herein. In one example, a method of operating an orbital satellite platform is provided. The method includes establishing relative distances between a plurality of satellite devices, and performing temporary adjustments to the relative distances between the satellite devices. The method also includes directing at least communication processes among the satellite devices based at least in part on the temporary adjustments to the relative distances.

16 Claims, 6 Drawing Sheets

(56) References Cited

U.S. PATENT DOCUMENTS

| | | |
|---|---|---|
| 5,925,092 A | 7/1999 | Swan et al. |
| 6,167,263 A | 12/2000 | Campbell |
| 6,178,163 B1 | 1/2001 | Yuan et al. |
| 6,301,476 B1 | 10/2001 | Monte et al. |
| 6,512,920 B1 | 1/2003 | Yaoya |
| 6,603,957 B1 | 8/2003 | Sherman et al. |
| 6,868,316 B1 | 3/2005 | Stevens |
| 6,985,454 B1 | 1/2006 | Wiedeman et al. |
| 7,151,929 B1 | 12/2006 | Jenkin et al. |
| 7,463,890 B2 | 12/2008 | Herz et al. |
| 7,992,134 B2 | 8/2011 | Hinchey et al. |
| 8,140,816 B2 | 3/2012 | Hofer et al. |
| 8,260,840 B1 | 9/2012 | Sirota et al. |
| 8,286,187 B2 | 10/2012 | Hou et al. |
| 8,706,869 B2 | 4/2014 | Campion et al. |
| 8,730,864 B2 | 5/2014 | Natarajan et al. |
| 8,797,969 B1 | 8/2014 | Harel et al. |
| 8,819,659 B2 | 8/2014 | Ramer et al. |
| 9,014,241 B2 | 4/2015 | Dick |
| 9,030,355 B2 | 5/2015 | Jarvis et al. |
| 9,042,295 B1 | 5/2015 | Balter et al. |
| 9,335,417 B2 | 5/2016 | Kim et al. |
| 9,363,712 B2 | 6/2016 | Chuberre et al. |
| 9,442,476 B2 | 9/2016 | Bliss et al. |
| 9,577,704 B2 | 2/2017 | Balter et al. |
| 9,641,238 B1 | 5/2017 | Coleman et al. |
| 9,654,204 B2 | 5/2017 | Ling et al. |
| 2002/0150060 A1 | 10/2002 | Montpetit |
| 2003/0054760 A1* | 3/2003 | Karabinis ............ H04B 7/1853 |
| | | 455/12.1 |
| 2003/0185215 A1 | 10/2003 | Wright et al. |
| 2003/0203717 A1 | 10/2003 | Chuprun et al. |
| 2004/0157598 A1 | 8/2004 | Parkman |
| 2004/0219879 A1 | 11/2004 | Stephenson |
| 2005/0050538 A1 | 3/2005 | Kawamata et al. |
| 2005/0143005 A1 | 6/2005 | Moore, III |
| 2006/0130056 A1 | 6/2006 | Bozak et al. |
| 2007/0106454 A1* | 5/2007 | Nonaka ................ G08G 1/092 |
| | | 701/423 |
| 2008/0155610 A1 | 6/2008 | Rosen |
| 2008/0252514 A1 | 10/2008 | Rigal et al. |
| 2008/0307466 A1 | 12/2008 | Wang |
| 2009/0042562 A1 | 2/2009 | Treesh et al. |
| 2009/0051589 A1 | 2/2009 | Schiff et al. |
| 2010/0058328 A1 | 3/2010 | DeHaan |
| 2010/0201569 A1* | 8/2010 | Lee ...................... G01S 5/0036 |
| | | 342/357.42 |
| 2011/0044236 A1 | 2/2011 | Giffen et al. |
| 2011/0196451 A1 | 8/2011 | Hill |
| 2012/0020280 A1 | 1/2012 | Jansson et al. |
| 2012/0197552 A1 | 8/2012 | Robinson et al. |
| 2012/0284716 A1 | 11/2012 | Martins et al. |
| 2013/0141307 A1 | 6/2013 | Nurnberger et al. |
| 2013/0194132 A1 | 8/2013 | Kim et al. |
| 2013/0275036 A1 | 10/2013 | Olivier et al. |
| 2013/0275975 A1 | 10/2013 | Masuda et al. |
| 2013/0305218 A1 | 11/2013 | Hirsch et al. |
| 2013/0336168 A1 | 12/2013 | Schlipf et al. |
| 2014/0039963 A1 | 2/2014 | Augenstein et al. |
| 2014/0068546 A1 | 3/2014 | Balasubramanian et al. |
| 2014/0201218 A1 | 7/2014 | Catalano et al. |
| 2014/0297874 A1 | 10/2014 | Matsubara et al. |
| 2015/0078178 A1 | 3/2015 | Carides et al. |
| 2015/0199197 A1 | 7/2015 | Maes et al. |
| 2015/0215030 A1 | 7/2015 | Moore, III |
| 2015/0219744 A1 | 8/2015 | Eikenberry et al. |
| 2015/0247928 A1 | 9/2015 | Waters et al. |
| 2015/0318916 A1 | 11/2015 | Gopal et al. |
| 2016/0009425 A1 | 1/2016 | Thompson et al. |
| 2016/0037434 A1 | 2/2016 | Gopal et al. |
| 2016/0080072 A1 | 3/2016 | Baudoin et al. |
| 2016/0094288 A1 | 3/2016 | Krebs |
| 2016/0132805 A1 | 5/2016 | Delacourt et al. |
| 2016/0226150 A1 | 8/2016 | Paleta, Jr. et al. |
| 2016/0242024 A1 | 8/2016 | Karren et al. |
| 2016/0283424 A1 | 9/2016 | Richardson |
| 2016/0314057 A1 | 10/2016 | De Oliveira et al. |
| 2016/0380909 A1 | 12/2016 | Antony et al. |
| 2017/0021947 A1 | 1/2017 | Pellegrino et al. |
| 2017/0026110 A1 | 1/2017 | Richardson et al. |
| 2017/0091047 A1 | 3/2017 | Bangalore et al. |
| 2017/0195040 A1 | 7/2017 | Sobhani et al. |
| 2017/0237804 A1 | 8/2017 | Baughman et al. |
| 2017/0250751 A1 | 8/2017 | Kargieman et al. |
| 2018/0092020 A1 | 3/2018 | Torres et al. |
| 2018/0155066 A1* | 6/2018 | Hwang ................. B64G 1/242 |

FOREIGN PATENT DOCUMENTS

| | | |
|---|---|---|
| CN | 105471493 A | 4/2016 |
| EP | 0365885 A2 | 5/1990 |
| EP | 2319700 A1 | 5/2011 |
| FR | 2796229 A1 | 1/2001 |
| FR | 2818055 A1 | 6/2002 |
| KR | 20130131652 A | 12/2013 |
| WO | 1993009613 A1 | 5/1993 |
| WO | 1995013671 A1 | 5/1995 |
| WO | 1996003823 A1 | 2/1996 |
| WO | 1999039459 A1 | 8/1999 |
| WO | 2006/038992 A1 | 4/2006 |
| WO | 2014022810 A2 | 2/2014 |
| WO | 2015198303 A1 | 12/2015 |
| WO | 2017023621 A1 | 2/2017 |
| WO | 2017027602 A1 | 2/2017 |

OTHER PUBLICATIONS

Center, Kenneth B., "Describing and Deploying Satellite Behaviors Using Rules-Based Statecharts," 28th Annual AIAA/USU Conference on Small Satellites, 8 pages, Aug. 4, 2014.

International Application No. PCT/US2016/059623, International Search Report & Written Opinion, 12 pages, dated Jan. 9, 2017.

Panunzio, Marco et al., "An Architectural Approach With Separation of Concerns to Address Extra-Functional Requirements in the Development of Embedded Real-Time Software Systems," Journal of Systems Architecture, pp. 770-781, Jun. 19, 2014.

Romer, Kay et al., "The Design Space of Wireless Sensor Networks," IEEE Wireless Communications, pp. 54-61, Dec. 2004.

* cited by examiner

| TASK | RELATIVE DISTANCE | COMM. BW | LEVEL OF SERVICE |
|---|---|---|---|
| VM file level state transfer | far | low | 2 |
| VM file level state transfer | near | high | 1 |
| VM block level state transfer | far | low | 1 |
| VM block level state transfer | near | high | 9 |
| user payload application A | far | low | 2 |
| user payload application A | near | high | 5 |
| user payload application B | far | low | 4 |
| user payload application B | near | high | 3 |
| ground communications | far | low | 1 |
| ground communications | near | high | 9 |
| system updates | far | low | 0 |
| system updates | near | high | 7 |
| blockchain sync. A | far | low | 1 |
| blockchain sync. A | near | high | 8 |
| blockchain sync. B | far | low | 8 |
| blockchain sync. B | near | high | 1 |

BANDWIDTH OPTIMIZING RANGE ADJUSTMENTS AMONG SATELLITES

BACKGROUND

Satellites can be deployed into orbit to provide various space-based operations, such as military and civilian observation operations, communications operations, navigation operations, weather operations, and research operations. Satellites can include various sensors and communication equipment that are used to perform desired tasks. However, most satellites deployed in orbit comprise singular entities that are expensive to create and launch into orbit, especially for organizations that may not require the use of an entire satellite with a large number of sensors, or may not require continuous operations on the satellite. As a result, organizations may avoid the use of satellites, limiting the use of promising satellite technology. Furthermore, when many satellites are deployed, inter-satellite communications can be difficult to coordinate to achieve acceptable communication bandwidth.

OVERVIEW

Various enhanced operations and orbital techniques for satellite devices are discussed herein. In one example, a method of operating an orbital satellite platform is provided. The method includes establishing relative distances between a plurality of satellite devices, and performing temporary adjustments to the relative distances between the satellite devices. The method also includes directing at least communication processes among the satellite devices based at least in part on the temporary adjustments to the relative distances.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The various examples disclosed herein provide enhancements for satellite hardware and software technology. For example, a cluster of satellite devices can be deployed into orbit using a launch system. These satellite devices can comprise general-purpose satellite devices, such as CubeSat devices configured with processing systems, storage systems, and communication systems. These satellite devices can also have specialized roles which can be defined according to provisioned hardware or software elements, or can be associated with a particular set of applications deployed to the associated satellite devices. In some examples, individual satellite devices can be placed within a similar orbital path, and configured to have repeating or cyclical positioning adjustments within that orbital path. This cyclical positioning arrangement provides for enhanced communications, redundancy, and fault-tolerance, among other operations. Satellite devices can trigger communication processes or other various processes based on relative positioning among satellite devices.

In addition, the examples disclosed herein provide systems and methods for deploying software applications in an orbiting satellite platform, wherein each of the software applications executes as a virtual node that can share resources with one or more other applications deployed to the same satellite device. These virtual nodes may comprise full operating system virtual machines in some examples, and may further include virtual containers. These containers may include Docker containers, Linux containers, jails, or another similar type of virtual containment node, which can provide an efficient management of resources from a host system. The resources used by the containers may include kernel resources from the host computing system, and may further include repositories and other approved resources that can be shared with other containers or processes executing on the host. However, although resources may be shared between the containers on a host satellite device, the containers are provisioned to have private access to the operating system with their own identifier space, file system structure, and network interfaces.

In the present example, to provide the satellite platform, a plurality of satellite devices may be deployed, referred herein as satellites or satellite devices. Organizations may generate applications and deploy the applications to the satellite devices to perform desired operations. These operations may include military and civilian observation operations, communications operations, navigation operations, weather operations, cryptocurrency operations, and research operations. Applications and associated data may be deployed in one or more satellite devices of the orbiting satellite platform. In some implementations, the application and associated data may be provided to each of the one or more satellite devices using a ground control system or ground communication system as an uplink to the one or more satellite devices. In other implementations, a single uplink may be made to a satellite device in the platform, wherein the satellite device is configured to distribute the application to other desired satellite devices in the platform. Once deployed in the environment, the application may execute on the assigned satellite devices.

In some implementations, the satellite devices of the satellite platform may each exchange data or other information with one or more other satellite devices and the ground control system for the platform. This data may include current operational state information for each of the applications, such as the tasks or processes that are operating, processed portions of data, blockchain portions, or blockchain ledger portions, and may further exchange data generated at least partially from the sensors or processing components of the satellite. This data may be used in a peer group, wherein a first satellite may process first data, and provide the first data to a second satellite. The second satellite may then determine second data and process the first and second data as defined by the application. This operation may be used, as an example, in imaging operations, wherein a first satellite may take images of an object over a first period of time, and provide data for the images to the second satellite. The second satellite may take subsequent images and use the data for the first images and the subsequent images to make a determination about an object. In other examples, blockchain processing can be established across the cluster, where a first satellite device performs calculations or other processes on a blockchain or ledger, and passes resultant data to a second satellite device for further processing, storage, or distribution. It should be understood that other operations may use peer sharing of state data.

Figure 1:
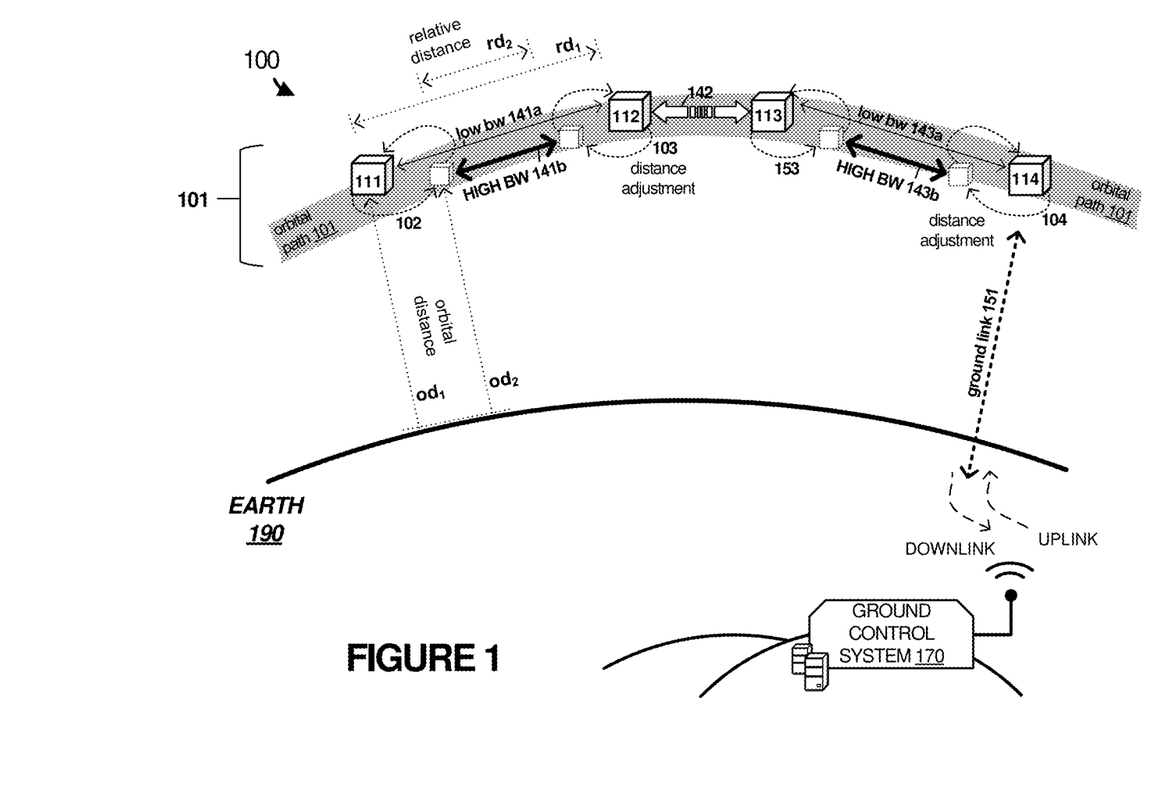
FIG. 1 illustrates a satellite environment according to an implementation.

As a first example satellite platform, FIG. 1 is shown. FIG. 1 illustrates a satellite environment 100 according to an implementation. Satellite environment 100 includes satellite cluster 110 with satellite devices 111-114 arranged in an orbital path 101. FIG. 1 also includes ground control system 170 and Earth 190. Orbital path 101 can comprise an orbital distance from the surface of Earth 190, orbital inclination, or other orbital properties or metrics that can differentiate and form groupings of satellite devices generally orbiting Earth 190 in a similar orbital configuration. Satellite devices 111-114 communicate over variable bandwidth wireless network links 141-143. Ground control system 170 communicates with satellite devices using associated wireless communication link 151.

As described herein, a plurality of satellite devices 111-114 may be launched and deployed as an orbiting platform for a plurality of different software application payloads. Ground control system 170 may initiate an uplink with one or more of the satellite devices to provide software application payloads to the satellite devices, as well as update any scheduling information for the satellite devices. Once uploaded to the desired satellite devices, the software application payloads may begin execution. In some implementations, the uplink from ground control system 170 may be responsible for providing the applications to the required satellite devices. In other implementations, ground control system 170 may supply an application to a first set of satellite devices, which may then distribute the application to one or more other satellite devices of the satellite platform. For example, ground control system 170 may provide a first application to satellite device 114 over link 151, wherein satellite device 114 may, in turn supply the application to other satellite devices in a peer group. In particular, satellite device 114 may provide the application to satellite device 113 that is in the same peer group, permitting satellite 113 to provide operations of the application without directly receiving the communication from ground control system 170. Additionally, similar to providing the initial configuration to the satellite devices, ground control system 170 may further be used to supply updates to each of the applications operating in the satellite platform, and may further update any scheduling information on each of the satellite devices.

Figure 2:
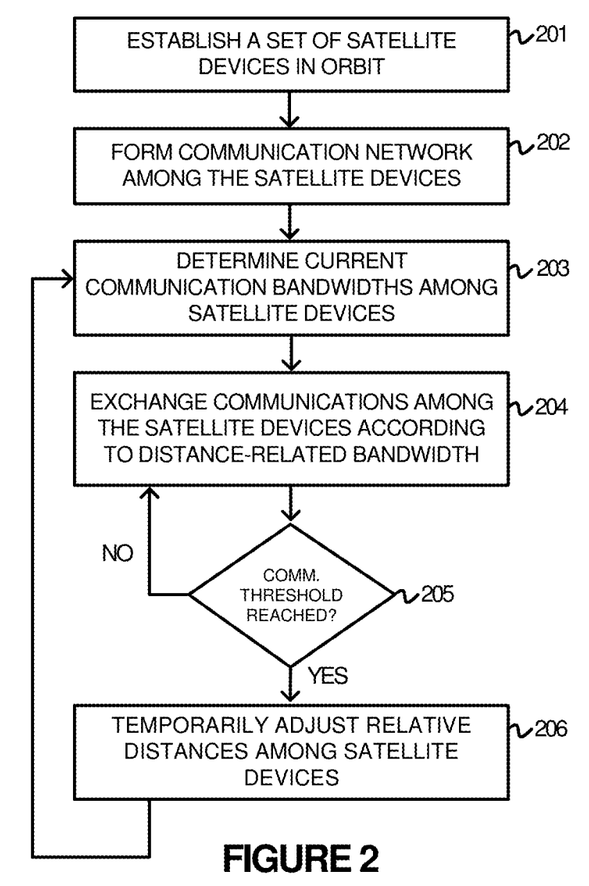
FIG. 2 illustrates operations of a satellite environment according to an implementation.

FIG. 2 is a flow diagram illustrating example operations of the elements of FIG. 1. In FIG. 2, satellite cluster 110 establishes (201) satellite devices within in orbital path 101. Orbital path 101 can be defined as comprising an orbital distance range from Earth 190, or according to other parameters that establish a range of congruent orbits that generally lie in a similar orbital arrangement. In other examples, orbital inclinations can be used to define different layers within a range of orbital distances. As will be discussed below, temporary adjustments are made by each of the satellite devices within this orbital path. Although FIG. 1 shows orbital path 101 including satellite devices 111-114, it should be understood that a different number of satellite devices can instead be employed.

A communication network is formed (202) among members of orbital path 101, which may be a subset of the total number of satellite devices of the orbital path. In FIG. 1, a communication network is formed among satellite devices 111-114 over links 141-143. After formation of the communication networks, satellite devices can selectively exchange communications. Satellite cluster 110 can establish forward communication paths in the orbital path, and establish reverse communication paths in the orbital path, with respect to an orbital trajectory or direction. Failures in satellite devices might cause interruptions in the communication pathways among satellite devices. However, since traffic can proceed in either direction, then redundant pathways can be formed to ensure reliable communications among the satellite devices of the layer. Moreover, satellite-to-ground communications can be facilitated over the communication network. A source satellite device can identify network traffic for delivery to ground control system 170, and transfer the network traffic for delivery to ground control system 170 over link 151 via the communication network. The source satellite device can transfer the network traffic to a peer satellite which can subsequently transfer to another peer satellite, and so on, until a peer satellite is found that can route the network traffic to ground control system 170 over link 151. For example, the network traffic can originate at satellite device 111, and be routed until the network traffic reaches satellite device 114 which currently has a communication link 151 established with ground control system 170.

The individual satellite devices that are arranged within orbital path 101 can determine (203) current communication bandwidths among the satellite devices. Communications can then be exchanged (204) among the satellite devices according to at least the range-related or distance-related bandwidths. Communication between any two satellite devices are typically line-of-sight, and associated bandwidths can be indicated by present signal conditions dependent upon relative distances among ones of the satellite devices. The signal conditions can be detected using signal strength determinations, bandwidth measurement processes, or based upon a measured distance. In FIG. 1, typically only neighboring satellite devices will communicate, forming a "chain" of communications described above. This arrangement can be due to the distance between non-neighboring satellites or due to line-of-sight limitations, among architectural choices for communications. An initial bandwidth can be established between two neighboring satellite devices, such as among pairs of satellite devices 111-112, 112-113, and 113-114. These bandwidths can allow for particular communication exchanges which can be selected according to present bandwidth conditions. Moreover, service levels or quality of service levels can be allocated to various communication types based on the present bandwidth conditions. As discussed herein, adjustments are made among ranges between satellites, measured in relative distances, and adjustments can be made to the quality of service allocations, or to priorities among applications, virtual nodes, and other elements of each satellite device.

Each satellite device 111-114 can perform temporary adjustments (206) to the relative distances between (or relative separations among) the satellite devices within orbital path 101. Changes in relative distances can be established by altering positions of associated satellite devices to achieve distance targets or bandwidth targets with respect to other satellite devices. These temporary adjustments can be achieved by changing relative positioning among the satellite devices using on-board propulsion or inertial adjustment equipment. In some examples, the adjustments are made to place a satellite device into a lower orbit relative to an initial state of the satellite device. This lower orbit can also be relative to a higher orbit of a neighboring satellite. Since the lower orbit typically indicates a faster orbital trajectory, a relative distance among the satellites is reduced over time and the two satellite devices approach each other. Likewise, a satellite device can make adjustments to place itself into a higher orbit relative to an initial orbit or to an orbit of another satellite. This higher relative orbit can indicate a slower orbital trajectory, and increase a relative distance among two neighboring satellites.

Since communications between neighboring satellite devices are typically line-of-sight communications, an associated communication bandwidth can be proportional to a relative distance. However, separate measurements of relative distances can be made by each satellite device, or these distance measurements can be estimated using achievable bandwidths among the satellite devices. As seen in FIG. 1, distance adjustments 102-104 are shown among neighboring satellite devices. Typically, satellite devices of satellite cluster 101 will be introduced together into an orbital pathway within a fixed range of orbits with respect the Earth 190, such as within a maximum orbital distance and a minimum orbital distance. Temporary adjustments to the orbits discussed herein can be made within this range of orbital distances, such as orbital distance '1' ($od_1$) for a 'high' orbit and orbital distance '2' ($od_2$) for a 'low' orbit. Greater differences between orbits of each satellite device within orbital path 101 can lead to faster changes in relative distances among satellite devices, and vice versa.

As further detailed in FIG. 1, satellite 111 can make orbital adjustments to place itself closer in relative distance to satellite device 112. Similarly, satellite device 112 can make orbital adjustments to place itself closer in relative distance to satellite device 111. When satellite devices 111 and 112 are at a larger relative distance, indicated by relative distance '1' ($rd_1$) in FIG. 1, a 'low' communication bandwidth 141a is achieved over link 141. When satellite devices 111 and 112 are at a smaller relative distance, indicated by relative distance '2' ($rd_2$) in FIG. 1, a 'high' communication bandwidth 141b is achieved over link 141. Variations of distances can be made that are different than the example shown in FIG. 1, such as intermediate distances. Similar adjustments to relative distance can be made among satellite devices 112 and 113, and among satellite devices 113 and 114. Since the satellite devices in FIG. 1 form a linear 'cluster' of satellite devices within orbital path 101, any adjustments that bring two satellite devices closer in relative distance might also take those satellite devices farther in relative distance from other neighboring satellite devices. Thus, a high bandwidth achieved among two satellite devices might correspond concurrently with a low bandwidth among other satellite devices.

The communication bandwidths discussed herein can be any relative high and low bandwidths, including intermediate values. Also, the bandwidths achievable can be dependent on other factors like the type of antenna, diameter of antenna elements, and amount of power available to antennas and transceivers. For example, a 'high' communication bandwidth might be greater than 700 Mbps (megabits per second), while a 'low' communication bandwidth might be less than 100 Mbps. As another example, a 100 Mbps bandwidth might correspond to a relative distance of 5700 km between satellite devices in the same orbital path. This 5700 km might be employed as a typical spacing among each satellite device for a satellite ring or constellation about the Earth that employs eight satellite devices in the same orbital path. If a pair of the satellite devices are moved to within 4500 km of one another, the bandwidth among that pair might increase to 200 Mbps, and at 2850 km the bandwidth might be 500 Mbps. Adjustments to relative distance may or may not require propulsion to achieve, but might instead be the result of no propulsion and allowing the satellite to drift for some period of time.

The temporary nature of the relative distance adjustments can be triggered by various factors, which initiate adjustments to relative distance. The satellite devices can then return to another relative distance, such as an initial relative distance or separation. These factors can include time thresholds, where each satellite device lingers within a particular distance range of a neighbor satellite device for a predetermined time period. The factors can also include activity triggers, such as application payload-based triggers, communication traffic-dependent triggers or virtual node state-dependent triggers. These application payload-based triggers can indicate that various on-board virtual node execution status or on-board communication status require higher bandwidth than is presently achievable with a neighboring satellite device, such as to exchange data/state with another satellite device or to burst exchange a large amount of traffic with ground control system 170. When time-based triggers are employed, a cyclic or periodic adjustment process can be established, where each satellite device cycles through a regular sequence of relative distance adjustments with neighboring satellite devices. For any given satellite device, a cyclic positioning configuration repeatedly decreases an associated relative distance with at least a neighboring satellite device and then increases the associated relative distance with at least the neighboring satellite device. When activity-based triggers are employed, then a satellite device might wait for a particular quantity of communication traffic to be buffered for transfer to another satellite device, or a satellite device might detect when particular applications/satellite devices might desire to employ a particular communication bandwidth only achievable via a closer relative distance, or various virtual node or payload activities might desire to have a larger available communication bandwidth for live-transfer of associated data. In cryptocurrency examples, synchronization or transfer of blockchain data or ledger data can coincide with adjustments in relative distance among satellite devices to ensure quality of service levels suitable for reliable transfer of associated data.

Thus, after one or more communication thresholds have been reached (205), due to changes in relative distance, then communication processes of the satellite devices can be altered or otherwise directed to occur (203) for achieving communications among satellite devices. When cyclic or periodic adjustments are employed, such as in repeatable or regularly scheduled adjustments, then communication processes can be directed among the satellite devices based at least in part on synchronizing the communication processes with the cyclic adjustments to the relative distances. Moreover, many communication types might all desire to communicate over a shared bandwidth of a communication link with a neighboring satellite device, and quality of service levels can be provided to each communication type according to priority assignments, traffic needs, or other factors. The communication processes might include adjusting communication prioritization among communication traffic routed among the satellite devices in accordance with the adjustments to the relative distances.

Advantageously, temporary bandwidth adjustments can be established among inter-satellite communications, resultant from the temporary adjustments to the relative distances among satellite devices. Communication traffic for transfer among the satellite devices can be selected based at least on the inter-satellite communication bandwidth adjustments. When neighboring satellite devices experience a 'larger' relative distance, those neighboring satellite devices can reduce a bandwidth allocation for transfer of selected communication types with the neighboring satellite devices. When a bandwidth threshold is exceeded corresponding to a decrease in an associated relative distance with among neighboring satellite devices, then neighboring satellite devices can increase a bandwidth allocation for transfer of selected communication types with the neighboring satellite devices. The satellite devices can adjust quality of service levels allocated among communications types exchanged among the satellite devices in accordance with associated relative distances. Furthermore, the satellite devices can direct virtual node execution priority in the satellite devices based at least in part on the temporary adjustments to the relative distances. Particular virtual node execution might produce a higher level of communication traffic related to those virtual nodes, or might produce traffic that requires a minimum bandwidth threshold level. The adjustments to relative distance herein can allow for certain virtual nodes to only execute (or to only receive a particular level of service) when threshold relative distances among satellites are achieved.

Turning back to the elements of FIG. 1, satellite devices 111-114 can comprise various hardware and software elements included in an orbital package. In some examples, the satellite devices comprise CubeSat form-factor devices, although variations are possible. Satellite devices can include one or more sensors, communication circuitry, processing circuitry, and control/logistical management elements. Figure discussions of satellite devices are included in FIG. 3 and FIG. 6 below.

Satellite devices 111-114 each include a hardware and software configuration that permits applications to execute as virtual nodes on the satellites. In some implementations, satellite devices 111-114 may be launched using a launch system without applications, and instead may be provided with a base operating system, virtual machine images, or hypervisor that can be used to load and execute applications as provided in an uplink from ground control system 170. In other implementations, satellite devices 111-114 may be configured with a first set of applications capable of being executed via an operating system or hypervisor on the satellites. Thus, once into orbit, the applications may initiate execution to provide the operations of the applications. These applications may further be added to, removed, and modified based on information provided in the uplink from ground control system 170.

Ground control system 170 comprises one or more control systems, servers, distributed computing and storage systems, among other elements. Typically, ground control system 170 includes one or more communication systems for receiving communications from satellite devices and for transferring communications to satellite devices. Ground control system 170 can include further network links to other networks, such as packet networks, the Internet, and other entities. In some examples, software payloads are staged in ground control system 170 and deployed to one or more satellite devices over ground-to-satellite link 151. Once received by at least a first satellite device, these software payloads can be distributed over peer-to-peer communication links and networks among the various satellite devices. Ground control system 170 can receive network traffic from satellite devices and route the network traffic to other network systems using include routes, bridges, switches, and other network handling equipment. Ground control system 170 also can receive network traffic for delivery to the satellite devices and transfer this network traffic for delivery to the satellite devices for distribution of the network traffic over the various orbital layers, pathways, and peers of the satellite cluster.

Links 141-143 and link 151 each comprise one or more communication pathways for exchanging network communications. Links 141-143 and link 151 can each comprise various logical, physical, or application programming interfaces. Example links can use optical, air, space, or some other element as the transport media. Links 141-143 and link 151 can each use various protocols and formats, such as Internet Protocol (IP), Ethernet, transmission control protocol (TCP), WiFi, Bluetooth, other wireless data interfaces, or some other communication format, including combinations, improvements, or variations thereof. Links 141-143 and link 151 can each include direct links or may include intermediate networks, systems, or devices, and can include a logical network link transported over multiple physical links. Links 141-143 and link 151 can each include routers, switches, bridges, traffic handling nodes, and the like for transporting traffic among endpoints.

Figure 3:
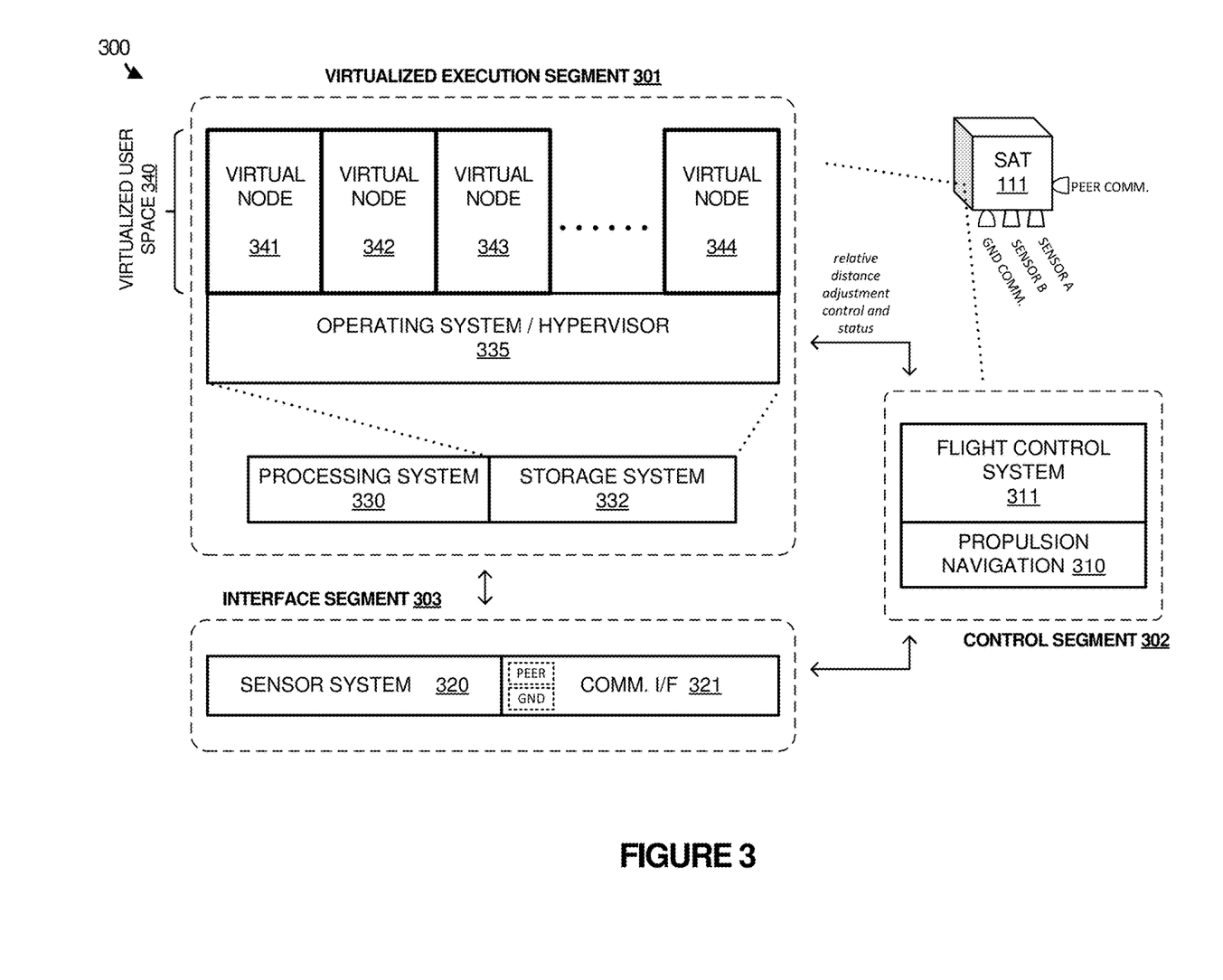
FIG. 3 illustrates an expanded view of a satellite capable of providing a platform for virtual nodes according to an implementation.

FIG. 3 illustrates an expanded view 300 of an exemplary satellite device 111 capable of providing a platform for virtual nodes according to an implementation. Any of satellite devices 111-114 can include similar features, and satellite device 111 is included as representative of any satellite device. Satellite device 111 includes virtualized execution segment 301, control segment 302, and interface segment 303, which may be coupled using various communication links. Virtualized execution segment 301 is representative of a virtualized execution system, which includes a virtualized user space 340 for virtual nodes 341-344, an operating system or hypervisor 335, a storage system 332 to store the operating system and virtual user space, and a processing system 330. Control segment 302 further includes flight control system 311 and propulsion navigation 310. Interface segment 303 further includes user sensor system 320 and communication interface 321, wherein communication interface 321 may be used for ground (gnd) communication and inter-satellite (peer) communication.

Sensor system 320 may include one or more sensor devices, including imaging sensors, temperature sensors, light sensors, signal quality sensors, or some other similar sensor capable of interaction with virtual nodes 341-344. In FIG. 3, sensors 'A' and 'B' are shown as illustrative of downward-facing sensors. It should be understood that other sensors can be included, such as star sensors, space imaging sensors, radiation detectors, or other sensors.

As described herein, organizations may generate applications that are capable of being deployed as virtual nodes on one or more satellites of a satellite platform. These applications may be provided from a ground control system, or may be provided from another satellite via communication interface 321 on satellite device 111. Once the applications are provided, operating system/hypervisor 335, which is stored on storage system 332 and executed by processing system 330 may provide a platform for the execution of the applications. Here, each application provided to satellite device 111 is executed as a separate virtual node in virtual nodes 341-344, wherein the virtual nodes may comprise full operating system virtual machines or containers capable of sharing resources from the underlying operating system in storage system 332.

To manage the execution of the virtual nodes, operating system/hypervisor 335 may comprise a control system to manage a schedule that is used to allocate processing resources of processing system 330 to each of the nodes, user sensors 320 to each of the nodes, and other similar resources on satellite device 111. In particular, the schedule may be used to ensure that each application is scheduled to receive processing resources from processing system 330 during defined time periods, and receive access to user sensors 320 during defined time periods. In some implementations, one or more of the applications may execute during the same time period on satellite device 111. These applications may use different sensors in user sensors 320, may time share the use of sensors in user sensors 320, or may use the same data from user sensors 320 in their operation. To allocate the sensors operating system 335 may be responsible for providing each operating virtual node with a communication link to the required user sensor, and deallocating or removing the communication link to the required sensor based on the scheduling. For example, an imaging device may be accessed by virtual node 341 during a first time period, wherein virtual node 341 may access the sensor based on addressing information provided by operating system 335. Once the time period expires, operating system 335 may prevent virtual node 341 from accessing the sensor, in some examples, by removing the addressing access of the virtual node, and allocating access of the sensor to a second virtual node.

In the examples herein related to adjustments to relative distance, execution and scheduling of virtual nodes 341-344 can also be controlled by operating system/hypervisor 335. In particular, the schedule mentioned above might be determined to coincide execution of particular virtual nodes with relative distances among other satellite devices, or based on resultant bandwidth levels presently achievable among neighboring satellite devices. For example, when regular or periodic adjustments among satellite devices are achieved, the schedule can indicate when particular virtual nodes receive a threshold level of execution resources. Certain ones of the virtual nodes might be de-prioritized relative to other virtual nodes which then receive a higher level of prioritization for execution by processing system 330. As these relative distances change, then the prioritization for execution can also change to prioritize certain virtual nodes over other virtual nodes.

Communication resources can also be allocated among virtual nodes according to presently available bandwidth or present relative distances among satellite devices. This allocation can be determined to differentiate among communication types, application types, application identities, virtual nodes, activities performed by the virtual nodes, or other activity types. When ones of the virtual nodes are executed in parallel or concurrently, then operating system/hypervisor 335 or other control systems can direct at least communication bandwidth allocations of inter-satellite communications among various communication types of the virtual nodes based at least in part on the adjustments to the relative distance. As these relative distances change, then the bandwidth allocations can also change to prioritize certain traffic types over other traffic.

In addition to the virtual node operations provided in virtualized execution segment 301, satellite device 111 further includes control segment 302. Control segment 302, which may be communicatively linked to virtualized execution segment 301 and interface segment 303, is responsible for logistical control elements of the satellite device 111. These operations may include managing the deployment of solar panels on the satellite, managing the positioning of the satellite device with regards to neighboring satellite devices of a satellite cluster, managing the positioning of the satellite device with regards to the Earth or the sun, performing orbital adjustments, or any other similar operation. In at least one example, flight control system 311 may monitor for requests from operating system 335, and determine whether the satellite is capable of accommodating the request from operating system 335. For example, virtual node 341 may generate a request to move a user sensor, which also requires movement using propulsion and navigation 310. In response to the request, flight control system 311 may determine that the movement cannot be made, and may prevent the movement of the satellite using propulsion and navigation 310. Further, in some implementations, flight control system 311, may provide a notification to operating system 335 and virtual node 341 indicating that the movement is not permitted.

In further examples, flight control system 311 can comprise a logistical control system for virtualized execution segment 301 or interface segment 303, and may monitor for requests to adjust relative positioning with respect to at least one neighboring satellite device. These requests can be issued to move satellite devices closer in relative distance to accommodate bursts of communication traffic generated by one or more virtual nodes, where the bursts of traffic desire to have a higher bandwidth communication link than presently established with another satellite device. Likewise, flight control system 311 may monitor for requests from operating system 335 to adjust relative positioning farther from a particular satellite device to either approach another satellite device in relative distance or to resume a nominal position that balances distances between two or more satellite devices. These requests might include cyclic or repeated periodic adjustments that allow for predictable changes in relative distance over the course of time. Various traffic differentiations, traffic prioritizations, quality of service adjustments, or virtual node execution prioritizations can be adjusted concurrent with the relative distance adjustments.

Propulsion and navigation elements 310 can comprise various equipment to move an associated satellite device with respect to neighboring satellite devices, move into different orbital configurations, adjust relative distances among satellite devices, or perform orientation/attitude adjustments. Propulsion and navigation elements 310 might comprise various engines, thrusters, inertial control and manipulation elements, or other elements capable of making adjustments to position, orientation, orbit, speed, or other movement parameters. Propulsion and navigation elements 310 can also comprise distance sensing equipment or navigation equipment to determine relative distances from Earth 190 or from other satellite devices. This distance sensing equipment or navigation equipment can comprise laser ranging equipment, radar equipment, or signal strength sensing equipment. Further examples can employ systems to determine geographic coordinates using one or more global positioning systems (GPS, GLONASS, Galileo), star-tracking systems, visual tracking systems, accelerometer-based tracking systems, or dead-reckoning systems, among others.

Although illustrated as a separate system in the example of FIG. 3, it should be understood that in some examples, flight control system may be implemented and stored on processing system 330 and storage system 332. However, it should also be understood that flight control system may be stored on a separate storage system and use a different processing system than operating system 335 and its corresponding virtual nodes.

Figure 4:
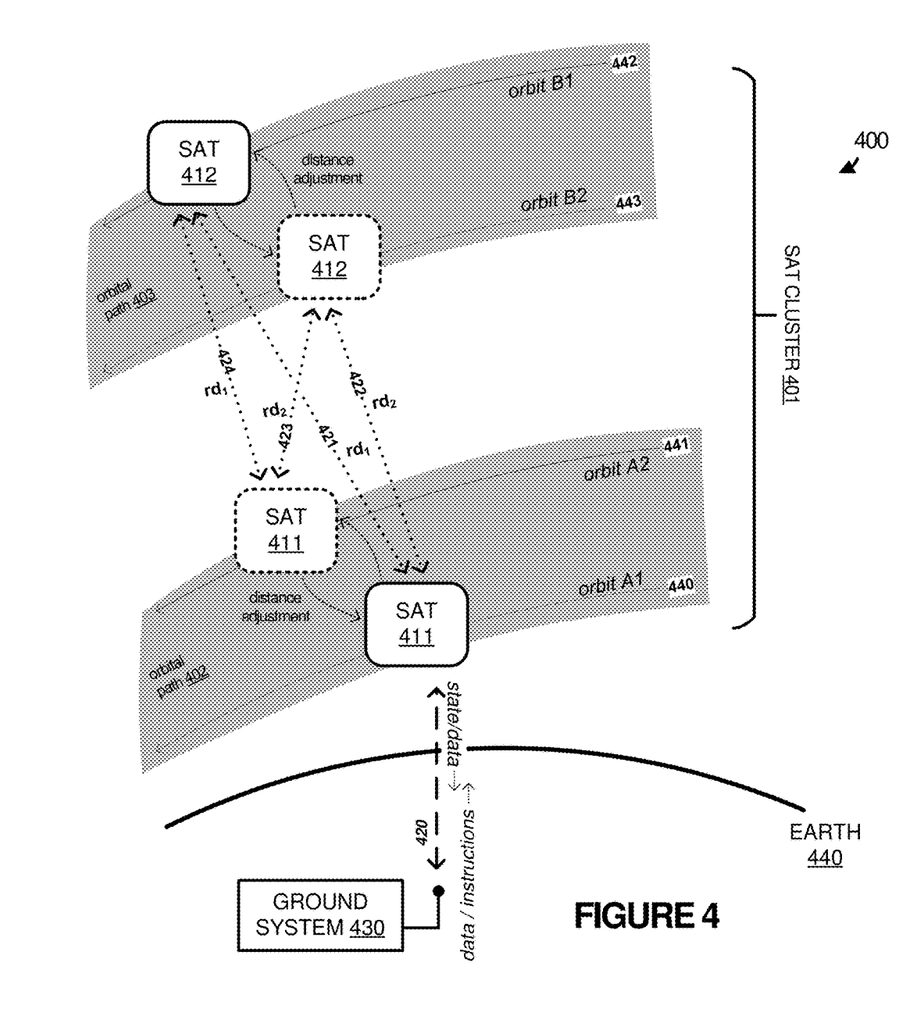
FIG. 4 illustrates a satellite environment according to an implementation.

Turning now to further configurations and operations of satellite clusters and satellite platforms, FIG. 4 is presented. FIG. 4 illustrates establishing multiple layers of satellites, with each of the satellites orbiting in an associated orbital path. The layers are formed using orbits or orbital ranges to achieve positioning of a satellite over a planet, such as in low-earth orbiting (LEO) over Earth 440. An example first layer/constellation LEO distance from Earth 440 might be around 600-700 km above Earth 440. A second layer/constellation may be at 750 km. As discussed in FIG. 1 above, various distance adjustments among satellite devices within the same orbital path are made to adjust communication bandwidths. These techniques can be employed in FIG. 4 when more than one satellite device per orbital path are included. The techniques in FIG. 4 can also illustrate example processes by which individual satellite devices of FIG. 1 can change among orbits within a same orbital path to adjust relative distances with respect to other satellite devices within that same orbital path. However, for clarity, the examples in FIG. 4 focus on relative distance adjustments among satellites in different orbital paths.

FIG. 4 includes satellite environment 400 comprising satellite cluster 401 that includes satellite devices 411-412. FIG. 4 also includes ground system 430 and Earth 440. Satellites 411-412 each move in an associated orbital path 402-403 about Earth 440, and these orbital paths form two "layers" of satellite devices at different distances from the surface of Earth 440. Within each orbital path, a particular satellite moves in an associated initial orbit which is then adjusted to an associated subsequent orbit. Specifically, satellite device 411 moves initially in orbit A1 (440) within orbital path 402, and satellite device 412 moves initially in orbit B1 (442) within orbital path 403. As orbital adjustments are made for each satellite device, another new associated orbit is established at a different altitude from Earth 440 with the respective orbital path. It should be understood that different orbits, orbital paths, and orbital directions can be employed.

In operation, members of satellite cluster 401 can communicate over one or more communication links, such as those described for communications in FIG. 1, although variations are possible. Selected members of satellite cluster 401 can also communicate with ground system 430 over link 420. For example, satellite device 411 might only have line-of-sight communications with ground system 430 at a present moment, and satellite device 412 can communicate through satellite device 411 to ground system 430.

Satellite device 411 and 412 can make adjustments to relative positioning or distance to adjust communication bandwidths. These adjustments can be made by adjusting orbital adjustments for one or more among satellite devices 411 and 412, such as by moving into a higher or lower orbit within a respective orbital path. In some examples, only one of the satellite devices adjusts to another orbit, while other examples have both satellites adjusting orbit. Thus, in FIG. 4, four example orbits are shown—two for each satellite device—comprising a higher orbit and a lower orbit with respect to Earth 440. Moreover, when each satellite device is in a particular orbit, a communication link can be established that has a corresponding bandwidth. The bandwidth can be proportional to a relative distance ($rd_1$-$rd_4$), and thus four possible bandwidths (421-424) can be achieved using the example orbits in FIG. 4.

These relative distance or orbital adjustments can be made responsive to cyclic or periodic timings, such as predetermined cycles of increasing relative distances and decreasing relative distances. When the distances are decreased, higher communication bandwidths can be achieved among satellite devices 411 and 412, and when the distances are increased, lower communication bandwidths among satellite devices 411 and 412 can be achieved. The lower communication bandwidths among satellite devices 411 and 412 might coincide with closer relative distances and higher communication bandwidths to other satellite devices of cluster 401 that are not shown in FIG. 4 for clarity. A schedule or timing profile might be employed by each of satellites 411-412 to determine when to adjust relative distances using positional or orbital changes. A satellite device can cycle through a series of adjustments to achieve a repeating cycle of communication bandwidth increases and decreases. These relative distance or orbital adjustments can instead be made responsive to current needs of software payloads of satellite devices 411 and 412. For example, when one or more virtual nodes executed by satellite devices 411 and 412 desires to transfer communications that prefer a higher bandwidth communication channel, then satellite devices 411 and 412 can approach one another by making orbital adjustments.

The adjustments to relative distance can affect not only bandwidth and throughput among satellite devices, but also communication latency. Communications or applications which require or desire low latencies might be timed to be active only when link latencies drop below desired threshold levels. These latencies might be measured in network communication ping times, such as in milliseconds (ms), communication propagation delays, round trip delays, or other latency metrics. Communications which are throughput or latency-sensitive might be prioritized when satellite devices are relatively closer together. Communications which are not throughput or latency-sensitive might be prioritized when satellite devices are relatively farther away. Various scheduling and prioritization among tasks, applications, communication types, virtual nodes, or other elements and processes of each satellite device can be controlled according to the relative distances among satellite devices. In further examples, distance adjustments might be requested by another satellite device via a communication channel, and a satellite device that receives the request can responsively make adjustments to alter a relative distance with respect to the requestor satellite device. In this manner, communications of another satellite device which require a particular communication throughput or latency can be transferred to a target satellite device.

Figure 5:
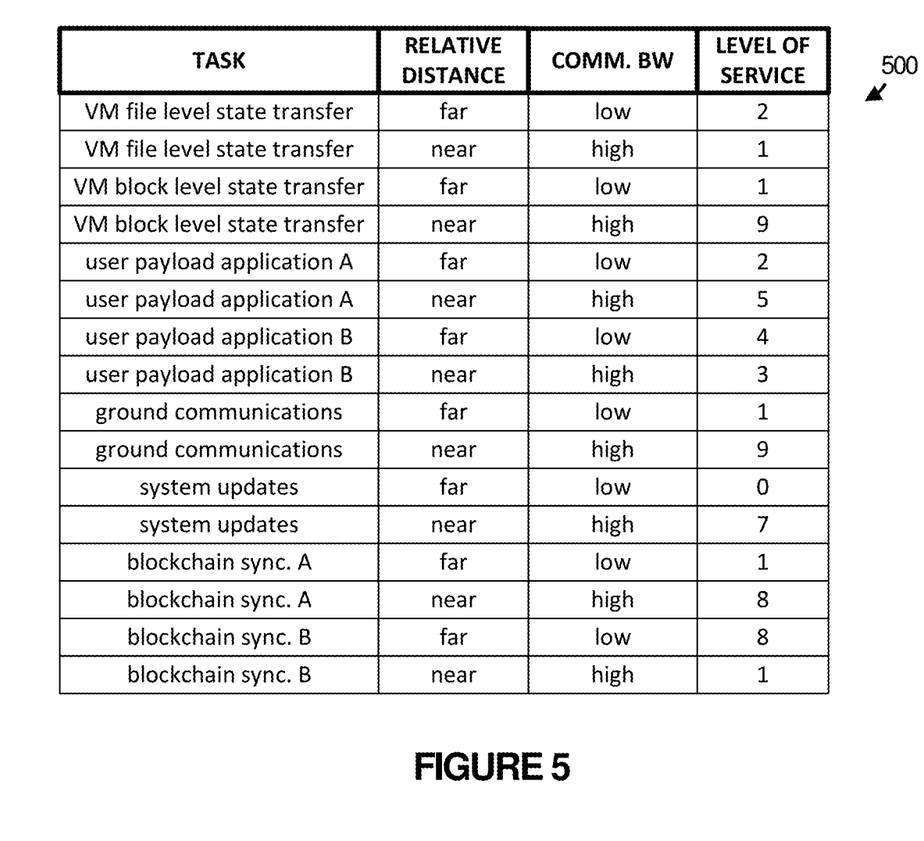
FIG. 5 illustrates communication type prioritization according to an implementation.

Moreover, as will be discussed in FIG. 5, various selections among quality of service levels provided to applications, virtual node types, or communication/traffic types can be achieved in accordance with the relative distances and associated adjustments to relative distances. FIG. 5 illustrates example quality of service prioritizations among various on-satellite elements and processes with regard to relative distance among satellite devices. FIG. 5 includes table 500 which includes these example prioritizations, and these can be applied to any of the examples herein.

In table 500, a first column indicates a particular 'task' which can be assigned a prioritization, a second column indicates relative distance levels among 'near' and 'far' relative distances, a third column indicates a communication bandwidth target of each task, and a fourth column indicates a prioritization or quality of service (QoS) level that is to be provided to the particular task. The prioritization or quality of service level for each task is correlated to a relative distance among satellite devices. QoS levels range from level 0 (suspend communications), level 1 (best effort, lowest functional QoS), to level 10 (high priority QoS). Tasks with higher QoS levels operate at a higher prioritization than tasks with lower QoS levels. Although the examples in FIG. 5 are generally related to communication link bandwidth allocation among communication types for particular tasks, other prioritization can be achieved in a similar fashion. For example, prioritization in execution on-satellite of the tasks themselves can be handled in accordance with the QoS levels. Since these tasks are typically implemented via virtual nodes on the satellite devices discussed herein, then execution prioritization of virtual nodes can correspond to the QoS levels. For example, when two satellite devices are relatively 'near' in distance or separation, a first quality of service level for each task is assigned, and when two satellite devices are relatively 'far' in distance or separation, then a second quality of service level for each task is assigned. It should be understood that the terms 'near' and 'far' are merely exemplary, and various distance thresholds can be established using kilometers, ping times, propagation delays, or other distance metrics. Moreover, although two distance levels are indicated in table 500 (e.g. near and far), various intermediate levels can be established with associated quality of service levels assigned thereto for each task.

Turning now to a discussion of the various tasks in the first column of table 500, each task can be a process or operational element of a satellite device. For examples, virtual machines (virtual nodes), user applications (software payloads), and communications might each have different entries in table 5. Other activities or tasks, such as system updates for updating system software, user applications, virtual machine software, hypervisor or operating system software, software payloads, task instructions, or other updates can be prioritized in table 500. Moreover, specific application payloads, such as cryptocurrency handling applications and virtual nodes, can each be assigned various prioritization as indicated in table 500.

Virtual machine file level state transfers might include state synchronization among virtual machines for backing up operational state of virtual nodes using file-level representations of state. These file-level representations might need less bandwidth/throughput than block-level state transfers, and thus are more suitable to lower bandwidths caused by larger relative distances among satellite devices. In FIG. 5, file-level state transfer is given a higher level of QoS for far relative distances than for near relative distances. This can accommodate a high prioritization for block-level state transfer during near relative distances and a low prioritization for block-level state transfer during far relative distances.

User payload applications might each have different requirements for latency and throughput. Thus, each user payload application can be assigned to a different QoS based on relative distance among satellite devices, as well as for prioritization among the various user payload applications. For example, a first user payload application A might be a high-bandwidth application for transfer of large bursts of data, such as an Earth imaging application, but might not be sensitive to latency or delays in transfer of that data. Thus, that first user payload application A can be prioritized lower for communication bandwidth when satellite devices are at a relatively far distance, but prioritized higher for communication bandwidth when satellite devices are relatively close. In contrast, user payload application B might have lower data transfer requirements, and thus be less sensitive to relative distances among satellite. Thus, user payload application B might have less variance among QoS levels. Furthermore, ground communications might be prioritized when satellite devices are near to give a large portion of available communication bandwidth for transfer of communications to and from ground systems. System update communications, on the other hand, might receive a relatively high QoS when satellite devices are near, but receive no communication bandwidth once satellite devices separate a threshold distance. This can be useful to prevent usage of bandwidth or execution priority for system updates. Moreover, some system-level operations, such as low-level operating system functions might require a low latency and be reserved only for near relative distances.

Finally, table 500 has cryptocurrency or other blockchain synchronization processes A and B. These might be different blockchain operations, using different algorithms, or might be different customers paying for different levels of service. When relative distances are greater, blockchain synchronization process A might be given a lower QoS level than when relative distances are less. This might accommodate latency-sensitive synchronization operations or operations which desire a burst of communications at high-throughput for a short period of time. In contrast, blockchain synchronization process B might be a lower-bandwidth task which can operate over a longer range of relative distances among satellites so that when satellite devices are near, blockchain synchronization process B can sacrifice prioritization relative to other tasks and still maintain functionality.

Figure 6:
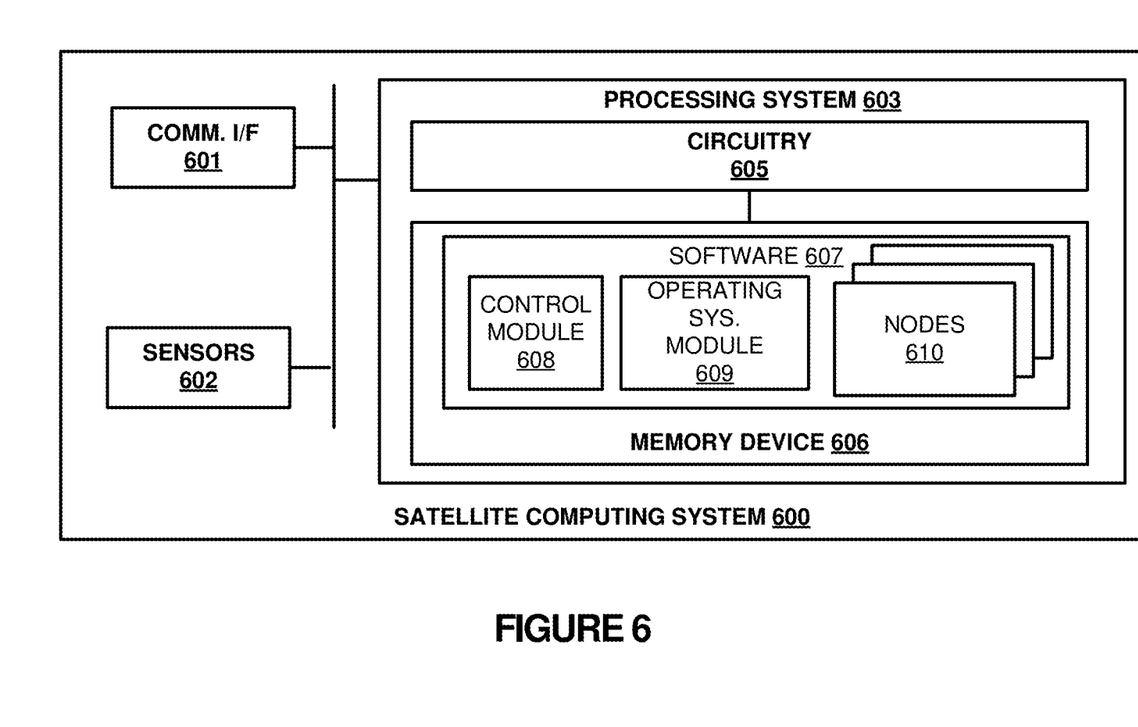
FIG. 6 illustrates a satellite computing system to provide a virtualized satellite application platform according to an implementation.

FIG. 6 illustrates a satellite computing system 600 to provide a virtualized satellite application platform according to an implementation. Computing system 600 is representative of any computing system or systems with which the various operational architectures, processes, scenarios, and sequences disclosed herein for a satellite device may be implemented. Computing system 600 can be an example of a satellite device from any of the preceding Figures, although other examples may exist. Computing system 600 comprises communication interface 601, sensors 602, and processing system 603. Processing system 603 is linked to communication interface 601 and sensors 602. Sensors 602 may comprise imaging sensors, heat sensors, light sensors, or some other similar type of sensor. Processing system 603 includes processing circuitry 605 and memory device 606 that stores operating software 607. Computing system 600 may include other well-known components such as a battery, solar panels, and enclosure that are not shown for clarity.

Communication interface 601 comprises components that communicate over communication links, such as network cards, ports, radio frequency (RF) circuitry, optical signaling circuitry, processing circuitry and software, or some other communication devices. Communication interface 601 may be configured to communicate over wireless links which use air or space as the communication medium. The wireless links can comprise any wireless electromagnetic communication, such as RF communications, VHF communications, UHF communications, microware communications, optical communications (e.g. visible, infrared, or ultraviolet), and combinations thereof. Communication interface 601 may be configured to use optical signaling, Internet Protocol (IP), IEEE 802.11 WiFi, among various wireless protocols, communication signaling, or some other communication format, including combinations thereof. In some implementations, communication interface 601 may communicate with one or more other satellites in a satellite platform and communicate with a ground control system.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device, but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media.

Processing circuitry 605 is typically mounted on a circuit board that may also hold memory device 606 and portions of communication interface 601 and sensors 602. Operating software 607 comprises computer programs, firmware, or some other form of machine-readable program instructions. Operating software 607 includes control module 608, operating system module 609, and nodes 610, although any number of software modules may provide the same operation. Operating software 607 may further include utilities, drivers, network interfaces, applications, or some other type of software. When executed by processing circuitry 605, operating software 607 directs processing system 603 to operate computing system 600 as described herein.

In at least one implementation, virtual nodes 610 may be deployed to satellite computing system 600 that represent full operating system virtual machines or containers, wherein each node is configured to provide a particular application. To run the nodes, operating system module 609, which may comprise an operating system and/or a hypervisor, may be executed by processing system 603, wherein operating system module 609 provides a platform for nodes 610. In some implementations, in providing the platform, operating system module 609 may be configured with a resource schedule having resource prioritization, which allocates processing resources, communication resources, and sensor resources to each node in nodes 610 according to various quality of service levels. This allocation of resources, may comprise time division allocation of resources, such as providing a first application with first quality of service levels for access to communication links or execution resources and providing a second application with second quality of service levels for access to the same communication links or execution resources, and may further include physical sharing of resources, such as providing one or more cores to a first virtual node and providing one or more secondary cores to a second virtual node.

In addition to executing the applications for each of virtual nodes 610, operating system module 609 may further provide a platform for state determination and distribution. This state determination may permit processing system 603 to identify states for each of the applications and share the states with other satellites and the ground control system. The states may include the operational state of processes within each application node, and/or data states for each of the application nodes. The states may be used in recovery of the various applications executing on satellite computing system 600, and may further be used in providing enhanced data operations for the applications. For example, an application executing as a node on satellite computing system 600 may communicate data to a second satellite node. This satellite node may identify second data, using processing elements or sensors on the second satellite, and combine the data from the first satellite with the second data to provide a particular operation. This operation may include imaging analysis in some examples, where the application can determine whether an object is moving, the type of object, the rate of movement in the object, or some other similar determination based on the combined data. This operation may include cryptocurrency operations, such as blockchain processes or cryptocurrency mining operations.

As an illustrative example, satellite computing system 600 may use sensors 602 to establish state information related to data gathered by the sensors. Once identified, the state information may be communicated to a second satellite device, wherein the second satellite device may employ second sensors to modify the state information with at least data captured by the second sensors. As another illustrative example, satellite computing system 600 may use one or more processing resources of processing system 603 to establish blockchain states related to cryptocurrency operations or other operations. Once blockchain states are determined, such as by processing a ledger or mining operations, the blockchain state information may be communicated to a second satellite device, wherein the second satellite device may employ second processing resources to modify the blockchain state information.

In some examples, in addition to or in place of exchanging the state information, the state information may also be used to provide a backup of satellite computing system 600. In particular, the state information may be shared with a second satellite device permitting the second satellite device to implement one or more virtual nodes from satellite computing system 600 when a failure is detected. This implementation or establishment of the one or more virtual nodes may occur directly at the satellite receiving the state information from satellite computing system 600, or may occur on a third satellite configurable by the satellite receiving the state information from satellite computing system 600.

Although illustrated in the previous example as providing information to other satellites, it should be understood that satellite computing system 600 may also be configured to receive state information from other satellites and provide similar operations in accordance with the received state information. These operations may include modifying the state information based on sensors for satellite computing system 600, modifying the state information based on processing resources of satellite computing system 600, or providing backup peering operations based on the state information provided from the secondary satellites.

In further examples, control module 608 can be employed to control periodic distance changes relative to another satellite device using one or more propulsion devices coupled to system 600. Bandwidth allocations among communication types, tasks, application payloads, virtual nodes, or other element can be achieved using a combination of elements of system 600, such as control module 608, operating system module 609, and communication interface 601.

As also illustrated in FIG. 6, satellite computing system 600 further includes control module 608, which is used as a flight control system for the satellite. In particular, control module 608, which may operate using distinct processing circuitry on satellite computing system 600, may be responsible for power management, logistics, and flight control of the satellite. In some examples, control module 608 may receive requests from nodes 610 and operating system 608 to provide data to the applications on nodes 610. If a request can be accommodated, without comprising the flight of the satellite, control module 608 may provide the requested data to operating system module 609 or the corresponding node. In contrast, if it is determined that the information cannot be provided or a flight operation cannot be accommodated, then control module 608 may fail to provide the data or the flight operation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A method of operating an orbital satellite platform, the method comprising:
   establishing relative distances between a plurality of satellite devices;
   performing temporary adjustments to the relative distances between the satellite devices comprising for one or more of the satellite devices, providing a cyclic positioning configuration that repeatedly decreases an associated relative distance with one or more neighboring satellite devices and then increases the associated relative distance with the one or more neighboring satellite devices; and
   directing at least communication processes among the satellite devices based at least in part on the temporary adjustments to the relative distances, wherein for the one or more of the satellite devices, directing the communication processes comprises reducing a bandwidth allocation for transfer of selected communication types with the one or more neighboring satellite devices until a bandwidth threshold is exceeded corresponding to a decrease in the associated relative distance with the one or more neighboring satellite devices.

2. The method of claim 1, wherein the communication processes comprise adjusting communication prioritization among communication traffic routed among the satellite devices in accordance with the temporary adjustments to the relative distances.

3. The method of claim 1, further comprising:
   establishing inter-satellite communication bandwidth adjustments resultant from the temporary adjustments to the relative distances, and selecting communication traffic for transfer among at least the ones of the satellite devices based at least on the inter-satellite communication bandwidth adjustments.

4. The method of claim 1, wherein performing the temporary adjustments to the relative distances between the satellite devices comprises decreasing first relative distances among first ones of the satellite devices to achieve temporary communication bandwidth levels among first ones of the satellite devices.

5. The method of claim 1, further comprising:
   adjusting quality of service levels allocated among communications types exchanged among the satellite devices in accordance with associated relative distances resultant from the temporary adjustments.

6. The method of claim 1, further comprising:
   directing virtual node execution priority in the satellite devices based at least in part on the temporary adjustments to the relative distances.

7. A satellite system, comprising:
   a communication network formed among a plurality of satellite devices in associated orbits; and
   each of the plurality of satellite devices configured to:
     establish relative distances between one or more neighboring satellite devices;
     perform periodic adjustments to the relative distances comprising providing a cyclic positioning configuration that repeatedly decreases an associated relative distance with the one or more neighboring satellite devices and then increases the associated relative distance with the one or more neighboring satellite devices; and
     direct at least communication processes among at least the one or more neighboring satellite devices based at least in part on the periodic adjustments to the relative distances by at least reducing a bandwidth allocation for transfer of selected communication types with the one or more neighboring satellite devices until a bandwidth threshold is exceeded corresponding to a decrease in the associated relative distance with the one or more neighboring satellite devices.

8. The satellite system of claim 7, wherein the communication processes comprise adjusting communication prioritization among communication traffic routed among at least the neighboring ones of the satellite devices in accordance with the periodic adjustments to the relative distances.

9. The satellite system of claim 7, wherein each of the plurality of satellite devices are further configured to synchronize inter-satellite communication bandwidth adjustments resultant from the periodic adjustments to the relative distances, and select communication traffic for transfer among at least the neighboring ones of the satellite devices based at least on the inter-satellite communication bandwidth adjustments.

10. The satellite system of claim 7, wherein each of the plurality of satellite devices are further configured to, during a first adjustment period, increase a first relative distance to at least a first satellite device while decreasing a second relative distance to at least a second satellite device, and during a second adjustment period, decrease the first relative distance to at least the first satellite device while increasing the second relative distance to at least the second satellite device.

11. The satellite system of claim 7, wherein each of the plurality of satellite devices are further configured to adjust quality of service levels allocated among communications types exchanged among at least the neighboring ones of the satellite devices in accordance with associated relative distances.

12. The satellite system of claim 7, wherein each of the plurality of satellite devices are further configured to direct virtual node execution priority based at least in part on the periodic adjustments to the relative distances.

13. An orbital satellite device, comprising:
   an inter-satellite communication system configured to communicate with one or more satellite devices of an orbital satellite cluster;

a propulsion control system configured to establish a relative distance between at least a selected satellite device, and perform adjustments to the relative distance to achieve a temporary communication bandwidth level with the selected satellite device by at least providing a cyclic positioning configuration that repeatedly decreases an associated relative distance with at least the selected satellite device and then increases the associated relative distance with at least the selected satellite device; and a control system configured to direct at least communication bandwidth allocations of the inter-satellite communication system among various communication types based at least in part on the temporary communication bandwidth level by at least reducing a bandwidth allocation for transfer of selected communication types with at least the selected satellite device until a bandwidth threshold is exceeded corresponding to a decrease in the associated relative distance with at least the selected satellite device.

14. The orbital satellite device of claim 13, comprising:
the control system configured to establish inter-satellite communication bandwidth adjustments resultant from the temporary communication bandwidth level, and select communication traffic for transfer to the selected satellite device based at least on the inter-satellite communication bandwidth adjustments.

15. The orbital satellite device of claim 13, comprising:
the control system configured to adjust quality of service levels allocated among communications types exchanged with the selected satellite device in accordance with the relative distance.

16. The orbital satellite device of claim 13, comprising:
the control system configured to direct virtual node execution priority in accordance with the relative distance.

* * * * *